(12) United States Patent
An et al.

(10) Patent No.: US 9,306,835 B2
(45) Date of Patent: Apr. 5, 2016

(54) SCALABLE FORWARDING TABLE WITH OVERFLOW ADDRESS LEARNING

(71) Applicant: JUNIPER NETWORKS, INC., Sunnyvale, CA (US)

(72) Inventors: Yafan An, Fremont, CA (US); Sandeep Kumar, Sunnyvale, CA (US); Gunes Aybay, Cupertino, CA (US); Rakesh Dubey, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/454,338

(22) Filed: Aug. 7, 2014

(65) Prior Publication Data

US 2014/0348170 A1 Nov. 27, 2014

Related U.S. Application Data

(62) Division of application No. 13/184,904, filed on Jul. 18, 2011, now Pat. No. 8,804,735.

(51) Int. Cl.
*H04L 12/721* (2013.01)
*H04L 12/751* (2013.01)
*H04L 12/707* (2013.01)
*H04L 12/743* (2013.01)
*H04L 12/723* (2013.01)
*H04W 28/02* (2009.01)
(Continued)

(52) U.S. Cl.
CPC .............. *H04L 45/124* (2013.01); *H04L 45/02* (2013.01); *H04L 45/025* (2013.01); *H04L 45/12* (2013.01); *H04L 45/127* (2013.01); *H04L 45/22* (2013.01); *H04L 45/50* (2013.01); *H04L 45/745* (2013.01); *H04L 45/7453* (2013.01); *H04L 61/10* (2013.01); *H04W 28/0278* (2013.01); *H04L 45/08* (2013.01); *H04L 45/54* (2013.01); *H04L 61/103* (2013.01); *H04L 67/1072* (2013.01)

(58) Field of Classification Search
None
See application file for complete search history.

(56) References Cited

U.S. PATENT DOCUMENTS

| 6,456,597 B1 | 9/2002 | Bare |
| 8,804,735 B2 | 8/2014 | An et al. |

(Continued)

FOREIGN PATENT DOCUMENTS

| EP | 2 012 484 A1 | 1/2009 |

OTHER PUBLICATIONS

European Search Report issued for corresponding Application No. EP 12 15 4002, mailed Apr. 19, 2013, 10 pages.

(Continued)

*Primary Examiner* — Joshua A Kading
(74) *Attorney, Agent, or Firm* — Harrity & Harrity, LLP

(57) ABSTRACT

A node is configured to receive a packet from a host device, where the packet includes a source address associated with the host device; determine that the source address is not stored by the node; generate one or more logical distances, associated with one or more nodes, based on the source address and a respective address associated with each of the nodes; determine that another node is associated with a shortest logical distance, of the one or more logical distances; and transmit the source address to the other node based on the determination that the other node is associated with the shortest logical distance, where transmitting the source address allows the other node to store the source address or enables further nodes to obtain the source address from the other node.

20 Claims, 7 Drawing Sheets

(51) Int. Cl.
*H04L 29/12* (2006.01)
*H04L 12/741* (2013.01)
*H04L 29/08* (2006.01)

(56) References Cited

U.S. PATENT DOCUMENTS

| | | |
|---|---|---|
| 2004/0223491 A1 | 11/2004 | Levy-Abegnoli et al. |
| 2006/0083254 A1 | 4/2006 | Ge et al. |
| 2006/0178156 A1* | 8/2006 | Kim ..................... H04W 40/08 455/466 |
| 2007/0058622 A1 | 3/2007 | Lee et al. |
| 2008/0107043 A1 | 5/2008 | Smith et al. |
| 2009/0228603 A1 | 9/2009 | Ritzau et al. |
| 2010/0080234 A1* | 4/2010 | Borkenhagen et al. .................... 370/395.31 |
| 2010/0080239 A1 | 4/2010 | Sergeev et al. |
| 2010/0290441 A1* | 11/2010 | Stewart ................. H04W 40/12 370/338 |
| 2011/0058474 A1 | 3/2011 | Nagapudi et al. |
| 2012/0250494 A1* | 10/2012 | Rong et al. .................... 370/216 |

OTHER PUBLICATIONS

Partial European Search Report issued for corresponding Application No. EP 12 15 4002, mailed Oct. 22, 2012, 5 pages.

* cited by examiner

SCALABLE FORWARDING TABLE WITH OVERFLOW ADDRESS LEARNING

RELATED APPLICATION

This application is a divisional of U.S. application Ser. No. 13/184,904, filed Jul. 18, 2011 (now U.S. Pat. No. 8,804,735), the contents of which are incorporated by reference.

BACKGROUND

Computing and communication networks typically include nodes, such as routers, firewalls, switches or gateways, which transfer or switch data, such as packets, from one or more sources to one or more destinations. The nodes may operate on the packets as the packets traverse the network, such as by forwarding or filtering the packet-based network traffic.

Nodes may receive traffic and may determine that the traffic includes source addressed and/or destination addresses that are not stored by the nodes. The nodes may learn the addresses by storing the addresses in memories (e.g., such as in forwarding tables) associated with the nodes. Storing the addresses may allow the nodes to identify other traffic that includes the addresses and/or obtain routing information, from other nodes, that enables the nodes to forward the traffic to destinations devices. Some nodes, however, may have memories that do not have capacity to store all of the addresses and may drop packets when the memory capacity has been reached.

SUMMARY

According to one aspect, a method, performed by a node, of a plurality of nodes, may include receiving a packet from a host device, where the packet may include a source address associated with the host device; determining that the source address is not stored by the node; and generating one or more logical distances, associated with one or more nodes of the group of nodes, based the determination that the source address is not stored by the node, where the one or more logical distances may be based on the source address and a respective address associated with each of the one or more nodes. The method may also include determining that another node, of the one or more nodes, is associated with a shortest logical distance, of the one or more logical distances; and transmitting the source address to the other node based on the determination that the other node is associated with the shortest logical distance, where transmitting the source address may allow the other node to store the source address or may enable further nodes, of the group of nodes, to obtain the source address from the other node.

According to another aspect, a node may include a processor to receive, from a host device, a packet that is destined for a destination host device, where the packet may include a destination address associated with the destination host device; determine that the destination address is not stored by the node; and generate one or more logical distances, associated with one or more nodes, based on the destination address and a respective address associated with each of the one or more nodes. The processor may also determine that a first node, of the one or more nodes, is associated with a shortest logical distance, of the one or more logical distances; determine whether the first node stores the destination address based on the determination that the first node is associated with the shortest logical distance; and transmit the packet, to the destination host device and via the first node or a second node of the one or more nodes, based on whether the first node stores the destination address.

According to still another aspect, a system may include a memory to store information that is used to forward packets based on destination addresses obtained from the packets. The system may also include one or more devices to receive, from one or more nodes, overflow information associated with the one or more nodes, where the overflow information, associated with each node of the one or more nodes, may include a capacity associated with a forwarding table; and assign one or more priorities to the one or more nodes based on a respective capacity associated with each node. The one or more devices may also identify one or more distances to the one or more nodes; select a node, of the one or more nodes, based on an identified distance, of the one or more distances, associated with the node and an assigned priority, of the one or more priorities, where selecting the node may allow a packet to be transmitted to a destination device, via the selected node, when the memory lacks capacity to store a destination address or a source address obtained from a packet.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Systems and/or methods, described herein, may enable a node, that has obtained an unknown destination address from a packet received from a host device, to identify another node (hereinafter referred to as a "hub node"), to determine whether the hub node stores the unknown destination address. The systems and/or methods may enable the node to forward the packet to the identified hub node based on a determination that the hub node stores the unknown destination address. The unknown destination address may correspond to an address that is not stored in a forwarding table associated with the node.

The systems and/or methods may enable the node, that has obtained an unknown source address from a packet received from a host device, to store the unknown source address in the node. The unknown source address may correspond to an address that is not stored in a memory associated with the node. The systems and/or methods may also enable the node to identify another hub node to which to publish the unknown source address. Publishing the unknown source address, to the other hub node, may allow other nodes to learn the unknown source address from the other hub node.

The systems and/or methods may allow the node to establish a protocol with a further node (hereinafter referred to as a "tandem node") and to transmit an unknown source address and/or unknown destination address to the tandem node when the node does not have a capacity to store the unknown source address and/or destination address. The systems and/or methods may allow the node to publish the source address, to the tandem node, based on the established protocol.

Publishing the source address, to the hub node or the tandem node, may enable the node or other nodes to access a quantity of source addresses that is greater than a capacity of the node or other nodes to store. Identifying a hub node that stores an unknown destination address may allow the node to forward traffic, associated with an unknown destination address, without transmitting (sometimes referred to as "flooding") copies of the packet, to one or more nodes within a network, to be forwarded to a destination device.

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1:
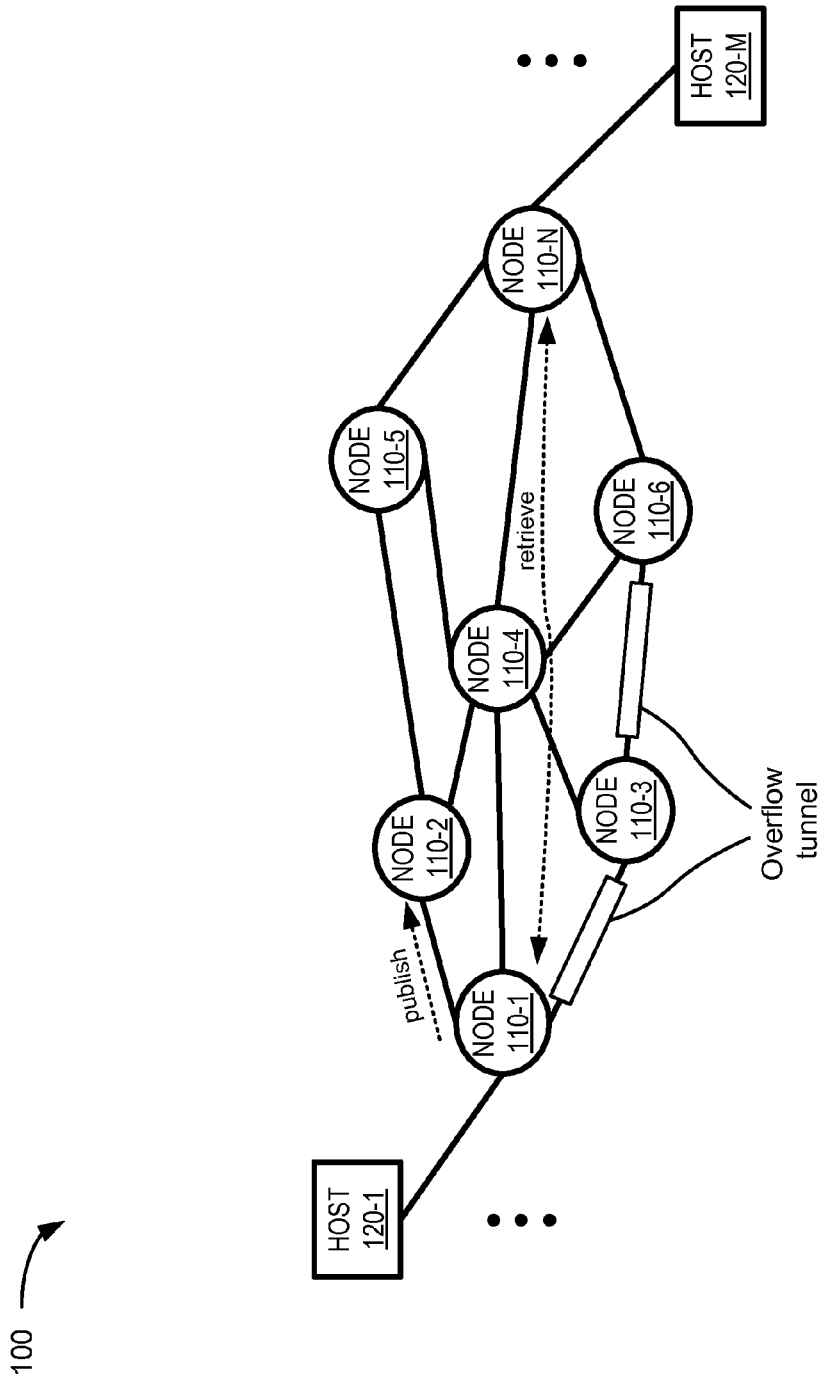
FIG. 1 is a diagram of an example network in which systems and/or methods described herein may be implemented.

FIG. 1 is a diagram of an example network 100 in which systems and/or methods described herein may be implemented. As shown in FIG. 1, network 100 may include a group of network nodes 110-1, . . . , 110-M (where M≥1) (hereinafter referred to collectively as "nodes 110" and individually as "node 110") and a group of host devices 120-1, . . . , 120-N (where N≥1) (hereinafter referred to collectively as "hosts 120" and individually as "host 120"). The number of nodes and/or host devices, illustrated in FIG. 1, is provided for explanatory purposes only. In practice, there may be additional nodes and/or host devices, fewer nodes and/or host devices, different nodes and/or host devices, or differently arranged nodes and/or host devices than illustrated in FIG. 1. Also, in some implementations, one or more of the nodes and/or host devices, of network 100, may perform one or more functions described as being performed by another one or more of the nodes and/or host devices of network 100. The nodes and/or host devices of network 100 may interconnect via wired connections, wireless connections, or a combination of wired and wireless connections.

Node 110 may include a network device that transmits traffic (e.g., packets). For example, node 110 may take the form of a routing device, a switching device, a multiplexing device, or a device that performs a combination of routing, switching, and/or multiplexing functions. In one implementation, node 110 may be a digital device. In another implementation, node 110 may be an optical device. In yet another implementation, node 110 may be a combination of a digital device and an optical device.

Node 110 may include an internal or external storage device and/or memory that stores information associated with node 110 operations. In one example, node 110 may store, in the storage device and/or memory, network topology information, routing tables, and/or packet forwarding tables. Node 110 may receive, process, and/or transmit packets traversing network 100. Node 110 may add and/or append (push) information (e.g., headers, trailers, tags, etc.) to incoming and/or outgoing packets. Node 110 may remove and/or extract information from incoming and/or outgoing packets.

Node 110 (e.g., node 110-1) may perform source address learning operations by storing an unknown source address, such as a media access control (MAC) address, a virtual local area network (VLAN) port address, etc., in a memory and/or storage device associated with node 110. The unknown source address may be obtained from a packet received from host 120-1 to which node 110 is connected. Node 110 may also identify another node 110 (e.g., node 110-2) that is a hub node 110. Node 110 may publish (e.g., as shown by the dashed arrow, labeled "publish") the unknown source address to hub node 110. Hub node 110 may receive the unknown source address and may store the unknown source address in a memory and/or storage device associated with hub node 110. Publishing the unknown source address, to hub node 110 may allow other nodes 110 to obtain the unknown source address from hub node 110. In another example, node 110 may publish an instruction, to hub node 110, to discard a source address that has expired and/or is no longer being used by host 120.

Node 110 may perform a destination address learning operation by retrieving an indication (e.g., as shown by the dashed arrow labeled, "retrieve"), from another hub node 110 (e.g., hub node 110-N), that the unknown destination address is stored by the other hub node 110. The unknown destination address may be obtained from a packet received from host 120-1. The other hub node 110 may be identified as a node that has learned the unknown destination address from host 120-M to which the other hub node 110 is connected. Node 110 may forward the packet to the identified other hub node 110.

Node 110 may communicate with a further node 110 that is a tandem node 110 (e.g., tandem node 110-6) to establish a protocol to be used to publish unknown source and/or destination addresses when overflow conditions exist within node 110. The overflow conditions may exist when node 110 does not have capacity to store unknown source and/or destination addresses. The protocol may be associated with a tunneling protocol (e.g., such as an Ethernet-over-Internet protocol (IP), generic routing encapsulation (GRE) protocol, Ethernet-over-multi protocol label switching, etc.). Instead of dropping packets when the overflow condition exists, node 110 may use an overflow tunnel (e.g., based on the tunneling protocol) to publish the unknown addresses, to tandem node 110-6, which may enable the unknown source address learning and/or destination address retrieval, as described above, to be performed by tandem node 110-6.

Host device 120 may include any computation or communication device, such as a wireless mobile communication device that is capable of communicating via network 100. For example, host device 120 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a tablet computer, a landline telephone, a set top box (STB), a television, a camera, a personal gaming system, or another type of computation or communication device. In another implementation, host device 120 may be a server device that may gather, process, search, store, and/or provide information in a manner similar to that described herein.

Figure 2:
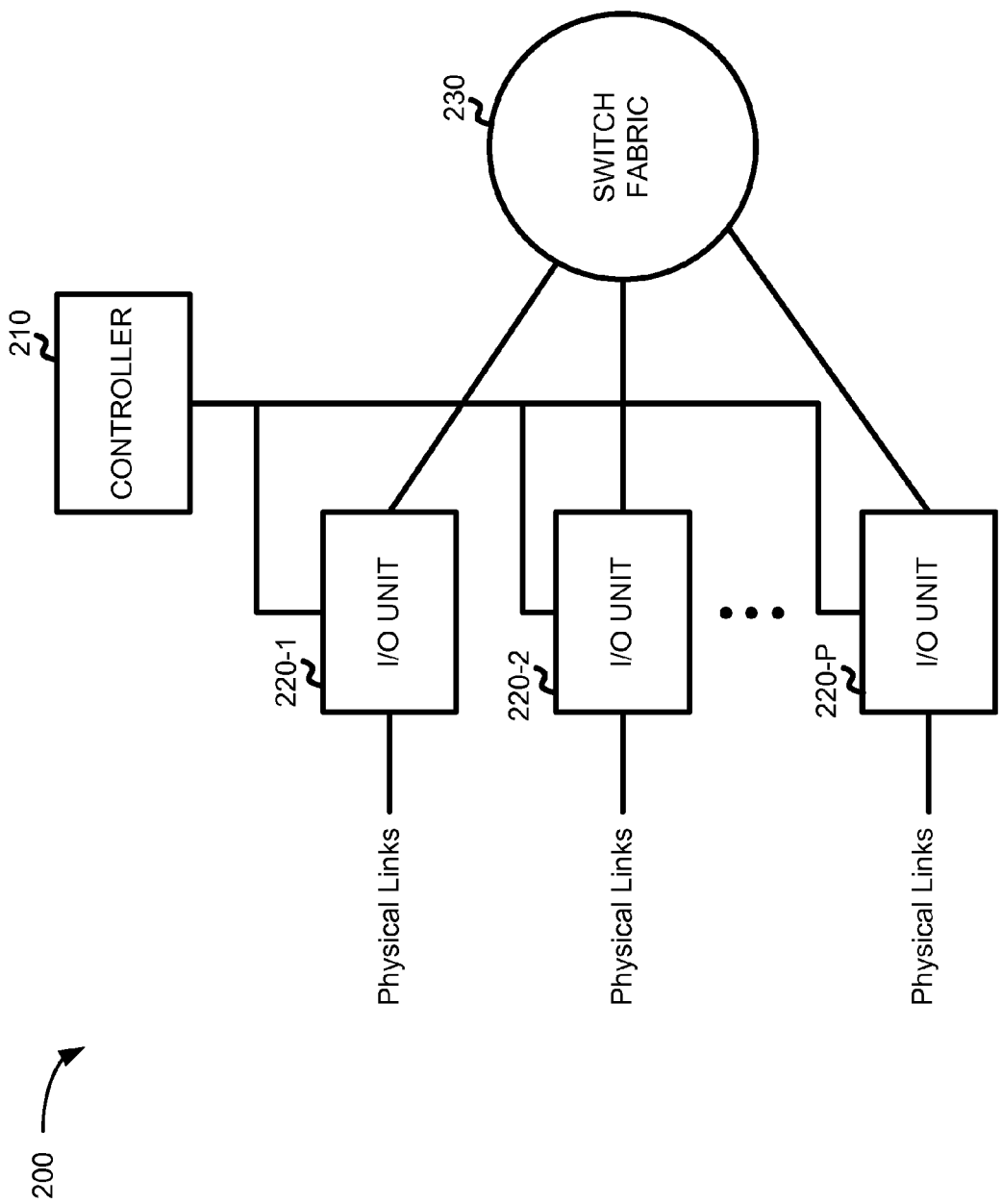
FIG. 2 is a diagram of example components of one or more network nodes of FIG. 1.

FIG. 2 is a diagram of example components of a node 200 that may correspond to node 110. Additionally, or alternatively, each node 110 may include one or more of nodes 200. Node 200 may include a data transfer device, such as a router, a gateway, a switch, a firewall, a network interface card (NIC), a hub, a bridge, a proxy server, an optical add-drop multiplexer (OADM), or some other type of device that processes and/or transfers traffic.

Node 200 may include a controller 210, a set of input/output (I/O) units 220-1, 220-2, . . . , 220-P (where P≥1) (hereinafter referred to collectively as "I/O units 220" and individually as "I/O unit 220"), and a switch fabric 230. Although, FIG. 2 illustrates example components of node 200, in other implementations, node 200 may include additional components, fewer components, different components, or differently arranged components than those illustrated in FIG. 2 and described herein. Additionally, or alternatively, one or more operations described as being performed by a particular component of node 200 may be performed by one or more other components, in addition to or instead of the particular component of node 200.

Controller 210 may include a processor, a microprocessor, or some form of hardware logic (e.g., an application specific integrated circuit (ASIC) or a field programmable gate array (FPGA)). In one example implementation, controller 210 may include an Ethernet controller and/or another controller device. Controller 210 may perform high-level management functions for node 200. For example, controller 210 may maintain the connectivity and manage information/data necessary for transferring packets by node 200. Controller 210 may create routing tables based on network topology information, create forwarding tables based on the routing tables, and communicate the forwarding tables to I/O units 220. I/O units 220 may use the forwarding tables to perform route lookup for incoming packets and perform the forwarding functions for node 200. Controller 210 may also perform other general control and monitoring functions for node 200. Controller 210 may perform source address learning operations by identifying a hub node 110 to publish an unknown source address. Controller 210 may also instruct hub node 110 to discard a source address that is no longer being used and/or has expired. Controller 210 may identify another hub node 110 that stores an unknown destination address and may forward traffic, associated with the unknown destination address, to the other hub node 110 via a particular I/O unit 220. Controller 210 may perform operations to establish a protocol with a tandem node 110 and/or may publish an unknown source address and/or unknown destination address to tandem node 110.

I/O unit 220 may include a component or collection of components to receive incoming packets, to process incoming and/or outgoing packets, and/or to transmit outgoing packets. For example, I/O unit 220 may include I/O ports, a packet forwarding component (PFC), an Ethernet interface and/or another type of interface, a central processing unit (CPU), and/or a memory device. I/O unit 220 may include a collection of ports that receive or transmit packets via physical links. I/O unit 220 may also include packet processing component(s), switch interface component(s), Internet processor component(s), memory device(s), etc.

Each of I/O units 220 may be connected to controller 210 and switch fabric 230. I/O units 220 may receive packet data on physical links connected to a network (e.g., network 100). Each physical link could be one of many types of transport media, such as an optical fiber or an Ethernet cable.

I/O units 220 may process incoming packet data prior to transmitting the data to another I/O unit 220 or the network. I/O units 220 may perform route lookups for the data using the forwarding table from controller 210 to determine destination information. If the destination indicates that the data should be sent out on a physical link, connected to I/O unit 220, then I/O unit 220 may prepare the data for transmission by, for example, adding any necessary headers (e.g., based on a tunneling protocol, etc.) and/or transmitting the data from the port associated with the physical link. If the destination indicates that the data should be sent to another I/O unit 220 via switch fabric 230, then I/O unit 220 may, if necessary, prepare the data for transmission to the other I/O unit 220 and/or may transmit the data to the other I/O unit 220 via switch fabric 230.

Switch fabric 230 may include one or multiple switching planes to facilitate communication among I/O units 220 and/or controller 210. In one implementation, each of the switching planes may include a single-stage switch or a multi-stage switch of crossbar elements. Switch fabric 230 may also, or alternatively, include processors, memories, and/or paths that permit communication among I/O units 220 and/or controller 210.

Figure 3:
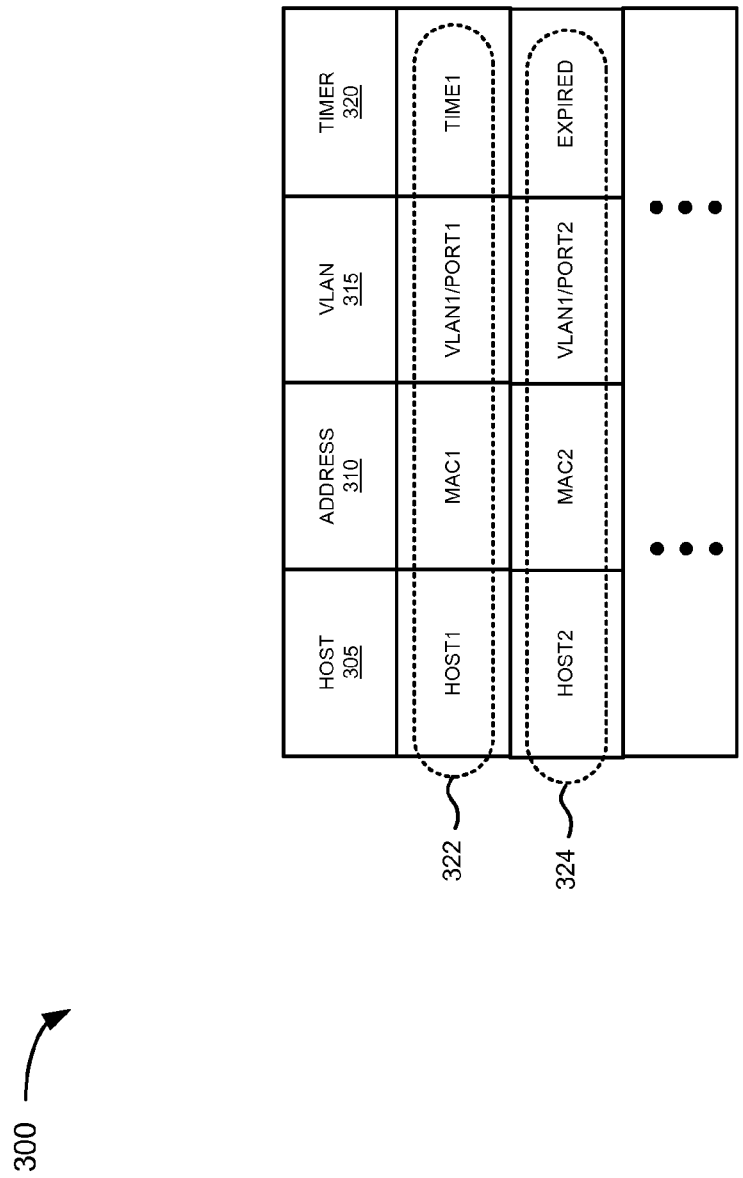
FIG. 3 is a diagram of an example data structure that stores address information associated with one or more host devices.

FIG. 3 is a diagram of an example data structure 300 that stores address information associated with one or more host devices 110. Data structure 300 may be stored in a memory and/or storage device associated with node 110. As shown in FIG. 3, data structure 300 may include a collection of fields, such as a host field 305, an address field 310, a virtual local area network (VLAN) field 315, and a timer field 320. Data structure 300 includes fields 305-320 for explanatory purposes. In practice, data structure 300 may include additional fields, fewer fields, different fields, or differently arranged fields than are described with respect to data structure 300.

Host field 305 may store information associated with a particular host 120 that is connected to node 110. The information, associate with the particular host 120, may include a device identifier (e.g., a mobile director number (MDN), a landline directory number (LDN), an international mobile subscriber identity (IMSI) number, a mobile subscriber integrated services digital network (MSISD) number, etc.), etc. Address field 310 may store a source address that was assigned to the particular host 120, by node 110, when the particular host 120 connected to node 110. The source address may include a MAC address. VLAN field 315 may store information associated with a VLAN, hosted by node 110, that node 110 uses to communicate with the particular host 120. The information associated with the VLAN may include an identifier associated with the VLAN (e.g., a name, a unique identification number, etc.), a port identifier associated with the VLAN, an IP address associated with the port, etc.). Timer field 320 may store information that identifies a period of time during which the MAC address is to remain valid and/or that the MAC address expires. Timer field 320 may, in another example, store information associated with a period of time during which the VLAN and/or the MAC address is to remain associated (sometimes referred to as a "VLAN-MAC binding").

For example, node 110 may receive a packet from host 120 and may store information, obtained from the packet, in data structure 300, such as an identifier associated with host device 120 (e.g., host1), and/or a MAC address (e.g., MAC1) that node 110 assigned to host 110 (e.g., as shown by ellipse 322). Node 110 may also store information, associated with a VLAN and/or a port associated with the VLAN, via which the packet was received (e.g., VLAN1/port1) (e.g., as shown by ellipse 322). Node 110 may store information that identifies a period of time since the MAC address was assigned and/or until the MAC address expires (e.g., TIME1). The period of time may additionally, or alternatively, correspond to a time when the MAC-VLAN binding expires. Node 110 may store other information, in data structure 300, obtained from packets received from another host 120 (e.g., host 2) (e.g., as shown by ellipse 324). In one example, node 110 may determine that another MAC address (e.g. MAC2) and/or the VLAN-MAC binding between the other MAC address and the VLAN (e.g., VLAN1/port2) has expired (e.g., as shown by ellipse 324).

Node 110 may identify an unknown source address based on a determination that the source address is not stored in data structure 300 and/or that the source address has expired. Node 110 may perform an operation to learn the unknown source address based on the determination that the source address is not stored in data structure 300. For example, node 110 may assign a source address (e.g., such a MAC address) to host 120 and/or may store the source address in data structure 300. Additionally, or alternatively, node 110 may associate the source address with the VLAN and/or a port associated with the VLAN, and may store information associated with the VLAN and/or the port in data structure 300. Node 110 may store a time that corresponds to the assignment of the source address, and/or the association of the VLAN and/or port to the source address.

Node 110 may publish the learned source address to a hub node 110. Node 110 may use a hash function and/or some other mathematical function to identify a hub node 110 to which the source address is to be published. For example, node 110 may compute an absolute value of a difference between a first hash of the source address (e.g., the source MAC address) and a second hash of an address (e.g., another MAC address and/or an address associated with a VLAN port) associated with another node 110 within network 100. Node 110 may repeat the computation for other addresses, associated with further nodes 110, within network 100, to generate different absolute values for each of the further nodes 110. Node 110 may identify which of the absolute values is the lowest absolute value. Node 110 may publish the learned source address to a particular node 110 that corresponds to the lowest absolute value.

Figure 4:
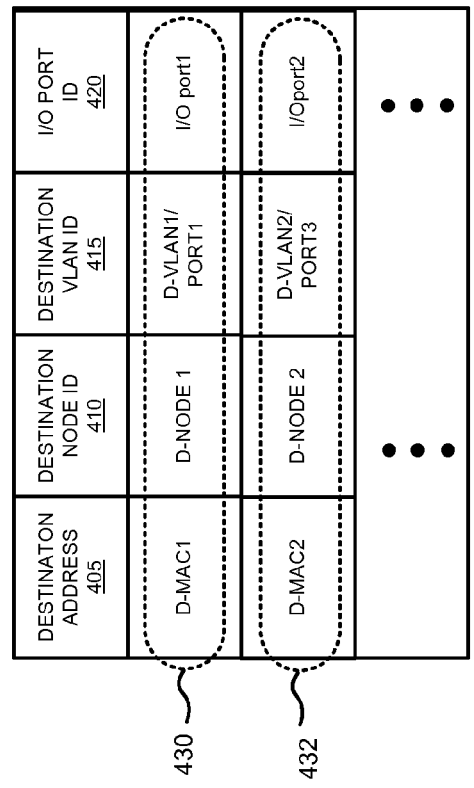
FIG. 4 is a diagram of an example data structure that stores routing information associated with the network of FIG. 1.

FIG. 4 is a diagram of an example data structure 400 that stores forwarding information associated with network 100. Data structure 400 may correspond to a forwarding table that is stored in a memory and/or storage device associated with node 110. As shown in FIG. 4, data structure 400 may include a collection of fields, such as a destination address field 405, a destination node identifier (ID) field 410, a destination virtual local area network (VLAN) identifier (ID) field 415, and an input/output (I/O) port identifier (ID) field 420. Data structure 400 includes fields 405-420 for explanatory purposes. In practice, data structure 400 may include additional fields, fewer fields, different fields, or differently arranged fields than are described with respect to data structure 400.

Destination address field 405 may store a destination address associated with host 120 (e.g., a destination host 120) to which a packet is to be transmitted. The destination address may include a destination MAC address associated with the destination host 120. Destination node ID field 410 may store information associated with another node 110 (e.g., a destination node 110) that is connected to the destination host 120 and/or via which the packet is to be transmitted in route to destination host 120. The information associated with the destination node 110 may include a device identifier or some other identifier associated with destination node 110.

Destination VLAN ID field 415 may store information associated with a destination VLAN, hosted by destination node 110, that destination node 110 uses to communicate with the destination host 120. The information associated with the VLAN may include an identifier associated with the destination VLAN (e.g., a name, a unique identification number, etc.), a port identifier associated with the destination VLAN, an IP address associated with the port, etc.). I/O port ID field 420 may indentify a particular I/O port 220 via which a packet, associated with the destination address, is to be transmitted to destination node 110.

For example, node 110 may receive, from host 120, a packet destined for destination host 120 and may obtain, from the packet, a destination address. Node 110 may retrieve, from a memory and/or storage device associated with node 110, data structure 400 and may use forwarding information stored within data structure 400 to transmit the packet to destination node 120. Node 110 may, for example, use the forwarding information to identify a destination node 110 (e.g., D-node 1), and/or a destination VLAN and/or port associated with the destination VLAN (e.g., D-VLAN1/port1), that corresponds to the destination address (e.g., D-MAC1) (e.g. as shown by ellipse 430). Node 110 may also identify a particular I/O port 220 (e.g., I/O port 1) via which the packet is to be transmitted to the identified destination node 110. Node 110 may use the forwarding information identify another destination node 110 and/or I/O port 220 via which another packet, destined for another destination host 120, is to be transmitted (e.g., as shown by ellipse 432).

In another example, node 110 may identify an unknown destination address based on a determination that the destination address is not stored in data structure 400. Node 110 may retrieve forwarding information associated with the unknown destination address. Node 110 may identify a hub node 110 that has previously learned the destination address (e.g., in a manner similar to that described above with respect to FIG. 3) and may transmit a packet, from which the unknown destination address was obtained, to the identified hub node 110. For example, node 110 may use a hash function and/or some other mathematical function to identify the hub node 110 by computing an absolute value of a difference between a first hash of the destination address (e.g., a destination MAC address) and a second hash of an address (e.g., another MAC address, VLAN port address, etc.) associated with another node 110 within network 100. Node 110 may repeat the computation using other addresses, associated with further nodes 110, within network 100, to generate different absolute values for each of the further nodes 110. Node 110 may identify which of the absolute values is the lowest absolute value and may identify a particular hub node 110 that corresponds to the lowest absolute value.

Node 110 may communicate with the particular hub node 110 to determine whether the particular hub node 110 stores the destination address. Based on a determination that the particular hub node 110 stores the destination address, node 110 may identify via which I/O port 220 to transmit the packet to the particular hub node 110. Based on a determination that the particular hub node 110 does not store the identified hub node 110, node 110 may identify another hub node 110 that corresponds to a next lowest absolute value. Node 110 may repeat the process, as described above, until a hub node 110 is identified that stores the destination address. Node 110 may use the forwarding information to identify via which I/O port 220 to transmit the packet to the identified hub node 110. Node 110 may update the forwarding tables by storing the destination address, the address associated with the identified hub node 110, and/or the identified I/O port 220 in data structure 400.

Figure 5:
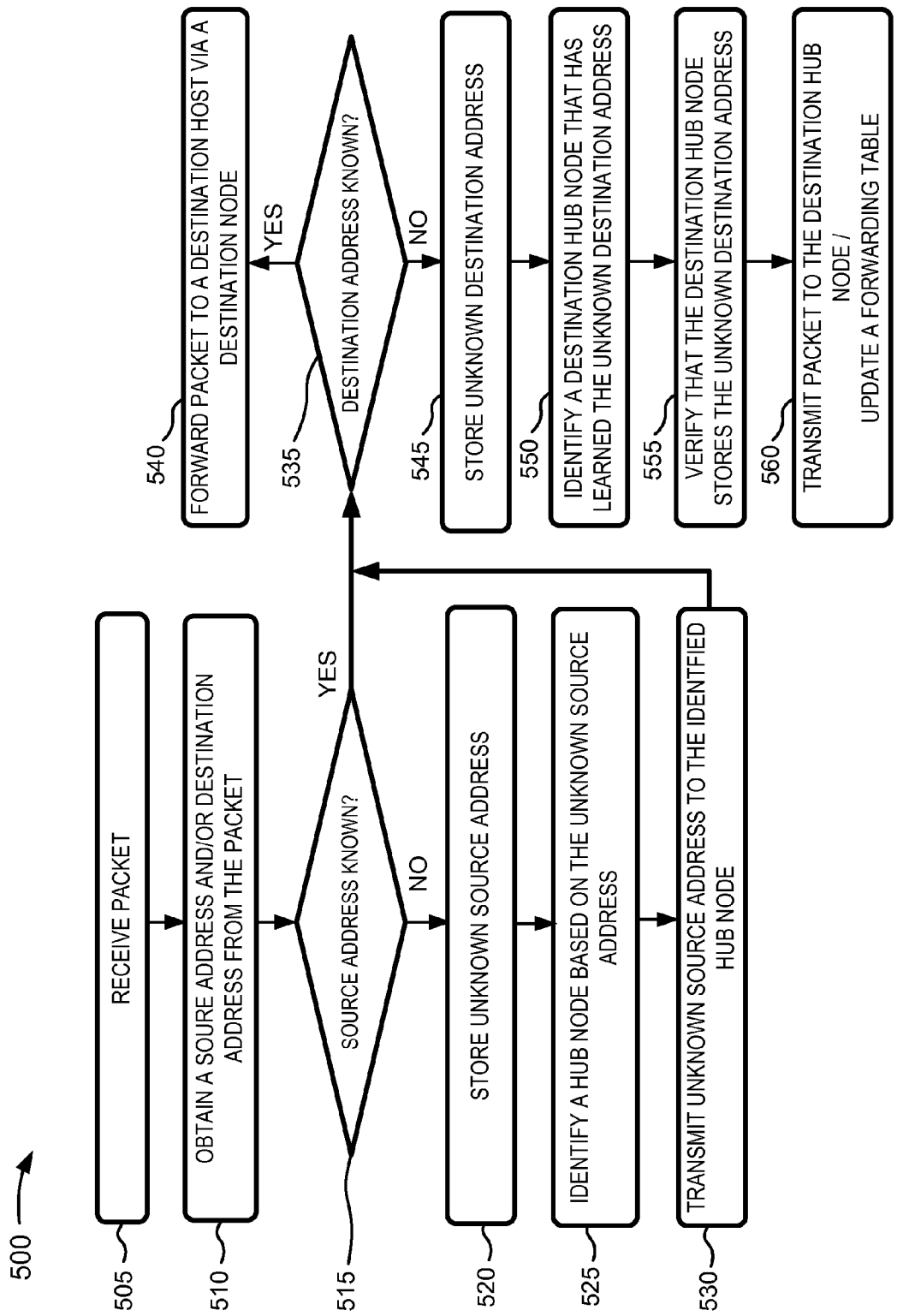
FIG. 5 is a flow chart of an example process for learning a source address and/or retrieving destination address information according to an implementation described herein.

FIG. 5 is a flow chart of an example process 500 for learning a source address and/or retrieving destination address information according to an implementation described herein. In one example implementation, process 500 may be performed by node 110. In another example implementation, some or all of process 500 may be performed by a device or collection of devices separate from, or in combination with, node 110.

As shown in FIG. 5, process 500 may include receiving a packet (block 505) and obtaining a source address and/or a destination address from the packet (block 510). For example, node 110-1 may receive, from host 120-1, a packet that is destined for destination host 120-M. Node 110-1 may obtain, from the packet, a source address (e.g., such as a source MAC address) associated with host 120-1. Node 110-1 may also obtain, from the packet, a destination address (e.g., such as a destination MAC address) associated with destination host 120-M.

As also shown in FIG. 5, if the source address is not known (block 515—NO), then process 500 may include storing the unknown source address (block 520). For example, node 110-1 may determine whether the source address is stored in a memory or storage device associated with node 110-1. Based on a determination that the source address is not stored in the memory and/or storage device, node 110-1 may store the unknown source address in the memory and/or storage device. In another example, node 110-1 may determine that the source address is stored in the memory, but has expired. Based on the determination that the source address is stored in the memory and has expired, node 110-1 may assign another source address to host 120-1 and may store, in the memory and/or storage device, the other source address and/or a time when the other source address was assigned to host 120-1. In yet another example, node 110-1 may associate the unknown source address and/or the other source address with a VLAN that is hosted by node 110-1. Node 110-1 may store, in the memory and/or storage device, information associated with the VLAN, a VLAN port via which node 110-1 communicates with host 120-1, and/or a time when the unknown source address and/or other source address was associated with the VLAN.

As further shown in FIG. 5, process 500 may include identifying a hub node 110-1 based on the unknown source address (block 525) and transmitting the unknown source address to the identified hub node (block 530). For example, node 110-1 may publish (e.g., transmit) the unknown source address or the other source address to a hub node 110-1. The identification of the hub node 110-1 may be based on a protocol, associated with a hash function and/or some other mathematical function (e.g., a cryptographic function), that enables a shortest logical distance to be identified between the unknown source address or the other source address, and an address associated with another node 110. For example, node 110-1 may compute a first logical distance based on an absolute value of a difference between a first hash of the unknown source address or other source address (e.g., such as a source MAC), and a second hash of an address (e.g., another MAC address and/or address associated with a VLAN port) associated with another node 110 (e.g., node 110-4) within network 100. Node 110-1 may repeat the computation for other addresses, associated with further nodes 110 (e.g., nodes 110-2, 110-3, 110-5, etc.) within network 100, to generate respective logical distances for each of the further nodes 110. Node 110-1 may identify which of the logical distances is a shortest logical distance. Node 110-1 may identify a particular node 110, associated with the shortest logical distance, as a hub node 110. Node 110-1 may publish (e.g. transmit) the unknown source address or the other source address to the identified hub node 110 (e.g., node 110-2) that corresponds to the shortest logical distance.

Node 110-1 may, in another example, identify another hub node 110 to publish the unknown source address and/or other source address based on a next shortest logical distance relative to the shortest logical distance. Node 110-1 may publish the unknown source address and/or other source address to the other hub node 110 for redundancy (e.g., to safeguard against lost packets by hub node 110) and/or for traffic load balancing purposes.

As yet further shown in FIG. 5, if the source address is known (block 515—YES) or after transmitting the unknown source address to the identified hub node (block 530), and if the destination address is known (block 535—YES), then process 500 may include forwarding the packet to the destination host device via a destination node (block 540). For example, node 110 may determine that the source address is stored in the memory and/or storage device associated with node 110 and may determine whether the destination address is stored in a forwarding table (e.g., such as data structure 400) that is stored in the memory and/or the storage device. In another example, node 110 may determine whether the destination address is stored in the forwarding table as a result of publishing the unknown source address or other source address to the identified hub node 110.

Node 110 may, for example, determine that the destination address is stored in the forwarding table and may identify a destination node 110-N that corresponds to the destination address. Node 110 may, based on the identification of the destination node 110-N, identify another node 110 (e.g., that corresponds to a next hop), that is adjacent to node 110-1 and via which the packet is to be transmitted to destination node 110-N. Node 110-1 may use the next hop to identify a particular I/O port 220 (e.g., based on the forwarding table) via which to transmit the packet, via the next hop, to destination node 110-N. Destination node 110-N may receive the packet and may transmit the packet to destination host 110-N.

As still further shown in FIG. 5, if the source address is known (block 515—YES) or after transmitting the unknown source address to the identified hub node (block 530), and if the destination address is not known (block 535—NO), then process 500 may include storing the destination address (block 545). For example, node 110 may determine that the source address is stored in the memory and/or storage device associated with node 110. Node 110 may also determine that the destination address is not stored in the forwarding table. In another example, node 110 may determine that the destination address is not stored in the forwarding table as a result of publishing the unknown source address or other source address to the identified hub node 110. Based on a determination that the destination is not stored in the memory and/or storage device, node 110 may store the destination in the storage device.

As also shown in FIG. 5, process 500 may include identifying a destination hub node that has learned the unknown destination address (block 550) and verifying that the destination hub node stores the unknown destination address (block 555). For example, the identification of the destination hub node 110 may be based on another protocol, associated with another hash function and/or some further mathematical function. The other protocol may enable a respective logical distance to be determined between the unknown destination address and addresses associated with other nodes 110 within network 100. A logical distance that is a shortest logical distance may correspond to a destination hub node 110 that stores the unknown destination address. For example, node 110-1 may compute the first logical distance based on an absolute value of a difference between a first hash of the unknown destination address (e.g., such as a destination MAC address) and a second hash of an address (e.g., another MAC address and/or address associated with a VLAN port) associated with another node 110 (e.g., node 110-2) within network 100. Node 110-1 may repeat the computation for other addresses, associated with further nodes 110 (e.g., nodes 110-3, . . . , 110-N) within network 100, to generate respective logical distances for each of the further nodes 110. Node 110-1 may identify which of the logical distances is a shortest logical distance and may identify a destination hub node 110 (e.g., destination hub node 110-N) that corresponds to the shortest logical distance.

Node 110-1 may communicate with destination hub node 110-N to verify that destination hub node 110-N stores the unknown destination address. Based on a determination that destination hub node 110-N stores the unknown destination address, node 110-1 may transmit the packet to destination hub node 110-N. If, however, node 110-1 determines that destination hub node 110-N does not store the unknown destination address, node 110-1 may identify another destination hub node 110 associated with a next shortest logical distance. Node 110-1 may communicate with the other destination hub node 110 to verify that the other destination hub node 110 stores the unknown destination address. If node 110-1 determines that the other destination hub node 110 does not store the unknown destination address, then node 110-1 may repeat the process until a destination hub node 110 is identified that stores the unknown destination address. If node 110-1 is not able to identify a destination hub node 110 that stores the unknown destination address, then node 110-1 may drop and/or ignore the packet.

As further shown in FIG. 5, process 500 may include transmitting the packet to the destination hub node 110 and updating a forwarding table (block 560). For example, node 110-1 may use a forwarding table to identify an adjacent node 110 (e.g., a next hop) via which the packet is to be transmitted when being forwarded to the destination hub node 110-N. Based on the identification of the next hop, node 110-1 may identify an I/O port 220 via which to transmit the packet to destination hub node 110-N (e.g., via the next hop). Destination hub node 110-N may receive the packet and may transmit the packet to destination host 110-N.

Node 110-1 may update the forwarding table by storing, in a manner that corresponds to the unknown destination address, information that identifies destination hub node 110-N, an address associated with destination hub node 110-N (e.g., a MAC address, an address associated with a VLAN hosted by destination hub node 110-N, etc.), information that identifies the next hop, and/or information that identifies I/O port 220 via which the packet was transmitted.

Figure 6:
FIG. 6 is a flow chart of an example process for establishing a protocol with a tandem node to process overflow source and/or destination addresses.

FIG. 6 is a flow chart of an example process 600 for establishing a protocol with a tandem node 110 to process overflow source and/or destination addresses. Establishing a protocol may include setting up a tunnel, based on a tunneling protocol, via which a packet may be transmitted. In one example implementation, process 600 may be performed by node 110. In another example implementation, some or all of process 600 may be performed by a device or collection of devices separate from, or in combination with, node 110.

As shown in FIG. 6, process 600 may include receiving information regarding overflow capabilities associated with one or more nodes 110 (block 605). For example, node 110-1 may receive, from one or more nodes 110, information regarding overflow capabilities associated with each of the one or more nodes 110. The information regarding respective overflow capabilities, for each of the nodes 110, may include an address (e.g., a MAC address, an address associated with a VLAN, etc.), a memory capacity (e.g., based on a quantity of bits, etc.), a capacity of forwarding tables (e.g., based on a maximum quantity of entries, etc.). In an example implementation, the information regarding the overflow capabilities may be obtained from a time-length-value (TLV) field, within hello packets, received from the nodes 110.

As also shown in FIG. 6, process 600 may include identifying distances to the one or more nodes and assigning a rank to the nodes based on the distances (block 610). For example, node 110-1 may use the information regarding the overflow capabilities to identify distances and/or best paths between node 110-1 and the one or more nodes 110. The distances and/or best paths may be computed in a number of ways, such as, for example, by a number of hops associated with a network path between node 110-1 and another node 110, where each hop corresponds to a different node 110 on the network path. In another example, the distance and/or best path may be based on a transit time associated with the network path, which may include node delay for each node 110 associated with the network path, available bandwidth, etc.

In yet another example, node 110-1 may compute logical distances for the nodes 110 in a manner similar to that described above, with respect to blocks 525 or 550 of FIG. 5. For example, node 110 may use a hash function or some other mathematical function to identify a logical distance between node 110-1 and another node 110 based on an absolute value of a first hash of an address associated with the other node 110 and a second hash of another address associated with node 110-1.

Node 110-1 may assign a respective rank to each of nodes 110 based a respective logical distance between node 110-1 and each of the nodes 110. For example, node 110-2 may be assigned a lower rank than node 110-N based on a first logical distance, associated with node 110-2, that is less than a second logical distance associated with node 110-N. In this example, if node 110-2 is associated with the shortest logical distance, then node 110-2 may be assigned a rank of one (e.g., R=1, where R is the assigned rank).

As further shown in FIG. 6, process 600 may include identifying capacities for the one or more nodes and assigning a priority to the one or more nodes based on the identified capacities (block 615). For example, node 110-1 may obtain, from the information regarding overflow capabilities, a respective capacity for each of nodes 110. The capacities may correspond to memory size and/or forwarding table capacity for each of the nodes 110. Node 110-1 may assign a respective priority to nodes 110 based on the respective memory size and/or forwarding table capacity. For example, node 110-3 may be assigned a higher priority than node 110-5 based on a determination that a first memory size and/or forwarding table capacity, associated with node 110-3, is greater than a second memory size and/or forwarding table capacity associated with node 110-5. In this example, if node 110-3 is associated with a largest memory size and/or forwarding table capacity, then node 110-1 may assign a priority of one (e.g., P=1, where P is the assigned priority).

As yet further shown in FIG. 6, process 600 may include assigning scores to the one or more nodes based on an assigned rank and/or an assigned priority (block 620). For example, node 110-1 may assign a score (e.g., S) to node 110 based on an assigned rank (e.g., R, where R is the assigned rank based on a logical distance) and/or an assigned priority (e.g. P, where P is an assigned priority based on memory size and/or forwarding table capacity). In one example, the score may be based on a sum of the rank and/or the priority (e.g., S≅R+P). In another example, the score may be assigned base on a product of the rank and/or the priority (e.g., S≅R*P).

In yet another example, the score may be based on a weighted sum of the rank and/or the priority (e.g., S≅A*R+ B*P, where A and B are weighting factors, and where A+B≅1). The weighting factors may be predetermined by node 110-1 and/or may be specified by an operator of node 110-1 and/or a network administrator. For example, when A>B, the assigned score may be based more heavily on the logical distance than memory size and/or forwarding table capacity. In another example, when A<B, the assigned score may be based less heavily one the logical distance than the memory size and/or forwarding table capacity. In yet another example, when A≅B, the assigned score may be based equally on the logical distance and the memory size and/or forwarding table capacity. Node 110-1 may assign a respective score to each of the one or more nodes 110 and may rank the nodes 110 based on the assigned score.

As still further shown in FIG. 6, process 600 may include selecting a node, as a tandem node, based on the assigned score (block 625). For example, node 110-1 may identify a particular node 110 based on a lowest assigned score. The lowest assigned score, in this example, may represent a logical distance that is shorter than all or most of the other nodes 110 and/or a capacity that is higher than all or most of the nodes 110. Node 110-1 may send a notification to the particular node 110 that identifies the particular node 110, as a tandem node 110 that node 110-1 may use to publish source addresses and/or to transmit destination addresses when an overflow condition exists on node 110-1. The overflow condition may exist on node 110-1 when node 110-1 can no longer store an unknown source address and/or unknown destination address. Tandem node 110 may receive the notification and may transmit information associated with a protocol (e.g., a tunneling protocol) that is to be used when publishing the unknown source address and/or destination address. In another example implementation, node 110-1 may include the information associated with the protocol in the notification. In yet another implementation, node 110-1 may obtain, from the information regarding the overflow capabilities of the particular node 110, information associated with a protocol to be used.

Node 110-1 may identify another tandem node 110 based on another assigned score (e.g., a next lowest score relative to the lowest score) to publish unknown source address and/or unknown destination address when an overflow condition, associated with node 110-1, exists. Node 110-1 may identify the other tandem node 110 for redundancy and/or for traffic load balancing within network 100.

Figure 7:
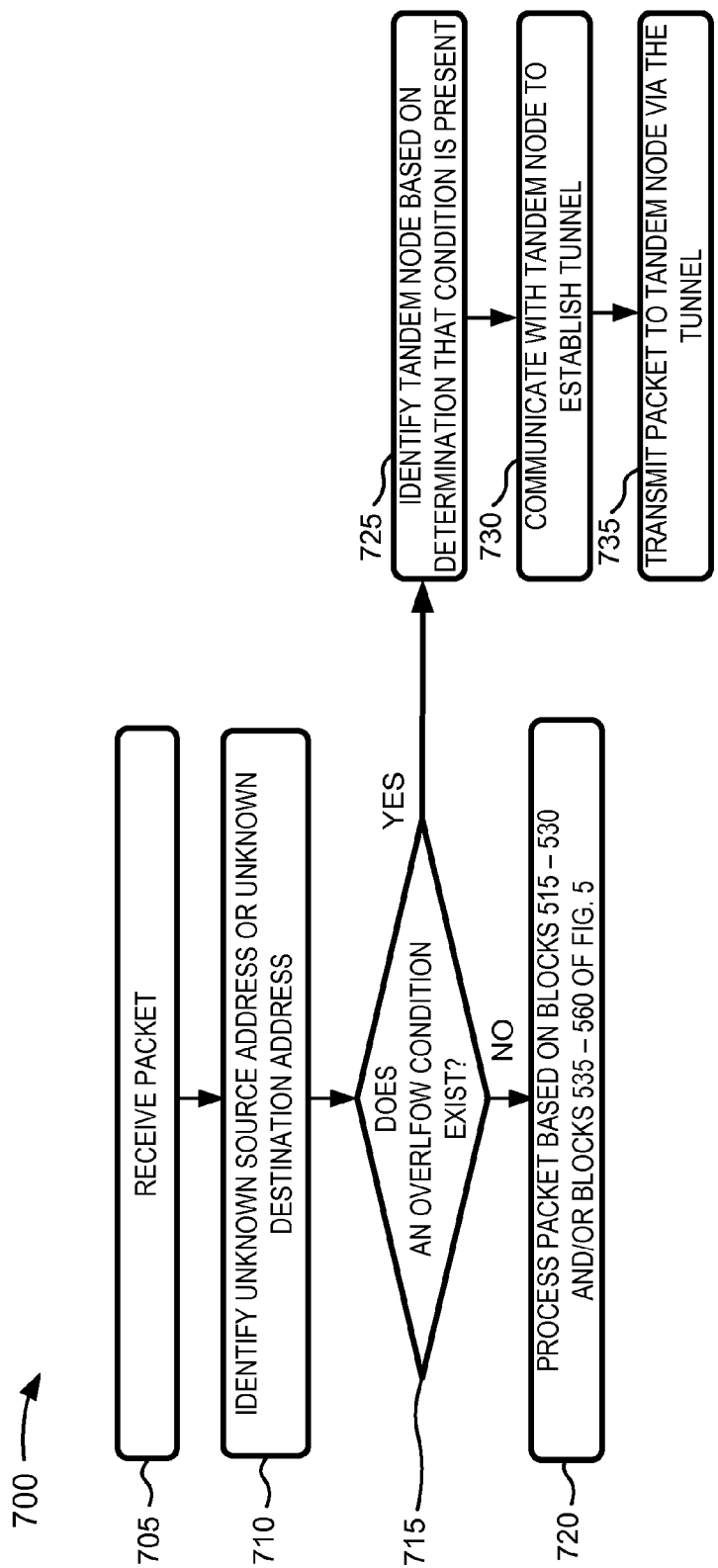
FIG. 7 is a flow chart of an example process 700 for using a tandem node to publish an unknown source and/or destination address when an overflow condition exists in a node of FIG. 1.

FIG. 7 is a flow chart of an example process 700 for using a tandem node 110 to publish an unknown source and/or destination address when an overflow condition exists in node 110. In one example implementation, process 700 may be performed by node 110. In another example implementation, some or all of process 700 may be performed by a device or collection of devices separate from, or in combination with, node 110.

As shown in FIG. 7, process 700 may include receiving a packet (block 705) and identifying an unknown source address and/or unknown destination address based on the packet (block 710). For example, node 110-1 may receive a packet, from host 120, that is destined for destination host 120-M. Node 110-1 may obtain, from the packet, a source address (e.g., a MAC address associated with host 120) and/or a destination address (e.g., another MAC address associated with destination host 120-M). Node 110-1 may determine whether an overflow condition, associated with node 110-1, exists.

As also shown in FIG. 7, if the overflow condition does not exist (block 715—NO), then process 700 may include processing the packet in a manner similar to that described above with respect to blocks 505-560 of FIG. 5 (block 720). For example, based on a determination that an unknown source address and/or unknown destination address has been identified with respect to the received packet, node 110-1 may determine whether a memory and/or storage device, associated with node 110-1, has capacity to store the unknown source address and/or the unknown destination address. More particularly, node 110-1 may determine whether a forwarding table (e.g., such as data structure 400 of FIG. 4), stored within the memory and/or the storage device, has the capacity to store an additional entry associated with the unknown destination address. In another example, node 110-1 may determine whether another data structure (e.g., data structure 300 of FIG. 3), stored within the memory and/or storage device, has the capacity to store an additional entry associated with the unknown source address.

Based on a determination that the memory and/or storage device has the capacity to store the unknown source address, node 110-1 may, in a manner similar to that described above with respect to blocks 520-530 of FIG. 5, store the unknown source address (e.g., in the memory and/or storage device) and/or may identify hub node 110 to publish the unknown source address to. Based on the identification of hub node 110, node 110-1 may publish the unknown source address to the identified hub node 110. In another example, based on a determination that the memory and/or storage device has the capacity to store the unknown destination address, node 110-1 may, in a manner similar to that described above with respect to blocks 545-560 of FIG. 5, store the unknown destination address (e.g., in the memory and/or storage device) and may identify a destination hub node 110 that stores the unknown destination address. Node 110-1 may transmit the packet to destination host 120-M via the destination hub node 110.

As further shown in FIG. 7, if the overflow condition exists (block 715—YES), then process 700 may include identifying a tandem node based on a determination that the condition exists (block 725). For example, based on a determination that the memory and/or storage device does not have the capacity to store the unknown source address and/or unknown destination address, node 110-1 may identify a tandem node 110 to publish the unknown source address and/or unknown destination address based on information, associated with tandem node 110, obtained from the memory and/or storage device. The information associated with tandem node 110 may have been stored, in the memory and/or the storage device, as a result of selecting tandem node 110 in a manner similar to that described above with respect FIG. 7.

As yet further shown in FIG. 7, process 700 may include communicating with the tandem node to establish the tunnel (block 730) and/or transmitting the packet to the tandem node via the tunnel (block 735). For example, node 110-1 may send a notification, to tandem node 110, that indicates that an overview condition exists with respect to node 110-1 and that a tunnel is to be established, based on a predetermined protocol (e.g., such as Ethernet-over-IP, GRE, and/or some other protocol), via which node 110-1 may publish the unknown source address and/or the unknown destination address. Node 110-1 may, for example, encapsulate the packet in a header associated with the protocol and may transmit the encapsulated packet, to tandem node 110, via the tunnel. Tandem node 110 may receive the encapsulated packet and may remove the header associated with the protocol and may obtain the unknown source address and/or unknown destination address from the packet. Tandem node 110 may store the unknown source address and/or the unknown destination address in a memory associated with tandem node 110, which may allow other nodes 110 to discover the unknown source address and/or unknown destination address.

In another example, another overflow condition, associated with tandem node 110 may exist. In this example, tandem node 110 may publish the unknown source address and/or unknown destination address to another tandem node 110. In yet another example, node 110-1 may obtain, from the memory, information associated with a further tandem node 110 and may publish unknown source address and/or unknown destination address to the further tandem node 110 when the overflow condition exists. Node 110-1 may identify the further tandem node 110 for redundancy purposes (e.g., in the event of packet loss within the other tandem node 110) and/or for traffic load balancing within network 100.

Systems and/or methods, described herein, may enable a node, that has obtained an unknown destination address from a packet received from a host device, to identify a destination hub node that stores the unknown destination address. The systems and/or methods may enable the node to forward the packet to the destination hub node to be transmitted to a destination host device. Identifying the destination hub node may allow the destination hub node to process the packet without flooding the packet to all ports and/or adjacent nodes, which may reduce utilization of bandwidth and/or processing resources within a network.

The systems and/or methods may enable the node, that has obtained an unknown source address from a packet received from a host device, to store the unknown source address in the node. The systems and/or methods may enable the node to identify another hub node to publish the unknown source address to. Publishing the unknown source address, to the other hub node, may allow other nodes to learn the unknown source address from the other hub node.

The systems and/or methods may allow the node to establish a protocol with a tandem node and to transmit an unknown source address and/or unknown destination address to the tandem node when an overflow condition exists on the node. The systems and/or methods may allow the node to publish the unknown source address and/or unknown destination address, to the tandem node, based on the established protocol. Publishing the source address, to the hub node or the tandem node, may enable the node to access a quantity of source addresses that is greater than a capacity of the node to store.

The foregoing description of implementations provides illustration and description, but is not intended to be exhaustive or to limit the implementations to the precise form disclosed. Modifications and variations are possible in light of the above teachings or may be acquired from practice of the invention.

For example, while series of blocks have been described with regard to FIGS. 5-7, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   a system memory to store information for forwarding packets; and
   one or more devices to:
     receive, from a plurality of nodes, overflow information associated with the plurality of nodes,
       the overflow information including information indicating, for each of the plurality of nodes, a capacity of a node memory included in a respective node of the plurality of nodes;
     identify a distance to each of the plurality of nodes;
     assign a score to each of the plurality of nodes,
       the score for the respective node being based on a capacity of the node memory included in the respective node and a distance to the respective node;
     select a node, of the plurality of nodes, based on the score assigned to the selected node;
     when the system memory does not have capacity to store an unknown address associated with a packet, transmit the packet to a destination device using the selected node; and
     when the system memory does have capacity to store the unknown address associated with the packet, store the unknown address in the system memory and transmit the packet to the destination device independent of using the selected node.

2. The system of claim 1, where the one or more devices are further to:
   transmit, when the system memory does not have the capacity to store the unknown address, a notification, to the selected node, that identifies a protocol to be used when transmitting the packet to the selected node.

3. The system of claim 1, where, when assigning the score to each of the plurality of nodes, the one or more devices are to:
   determine that a first node, of the plurality of nodes, includes a first node memory associated with a first capacity;
   determine that a second node, of the plurality of nodes, includes a second node memory associated with a second capacity; and
   assign a higher score to the first node than the second node based on a determination that the first capacity is greater than the second capacity.

4. The system of claim 1, where, when selecting the node, the one or more devices are to:

rank the plurality of nodes based on scores assigned to the plurality of nodes; and
select the node based on a determination that the selected node is ranked higher than another node of the plurality of nodes.

5. The system of claim 1, where the one or more devices are further to:
receive another packet destined for a host device;
determine that the system memory does not have the capacity to store a destination address or a source address obtained from the other packet; and
transmit the other packet to the selected node.

6. The system of claim 1, where the one or more devices are further to:
communicate with the selected node to establish a tunnel based on a predetermined protocol, where the predetermined protocol includes at least one of:
an Ethernet-over-Internet protocol (IP),
a generic routing encapsulation (GRE) protocol, or
Ethernet-over-multi protocol label switching (MPLS); and
transmit the packet, to the selected node, via the tunnel.

7. The system of claim 1, where, when identifying the distance to each of the plurality of nodes, the one or more devices are to:
identify a hop count associated with a network path between the selected node and one of the plurality of nodes,
where the hop count corresponds to a quantity of nodes via which a packet is transported between the selected node and the one of the plurality of nodes via the network path.

8. The system of claim 1, where the selected node is a first node, and where the one or more devices are further to:
select a second node, of the plurality of nodes, based on a second score assigned to the second node,
where selecting the second node allows the packet to be transmitted to the destination device, via the second node, when the first node is not available to transmit the packet to the destination device.

9. A method comprising:
receiving, by one or more devices and from a plurality of nodes, overflow information associated with the plurality of nodes,
the overflow information including information indicating, for each of the plurality of nodes, a capacity of a node memory included in a respective node of the plurality of nodes;
identifying, by the one or more devices, a distance to each of the plurality of nodes;
assigning, by the one or more device, a score to each of the plurality of nodes,
the score for the respective node being based on a capacity of the node memory included in the respective node and a distance to the respective node;
selecting, by the one or more devices, a node, of the plurality of nodes, based on the score assigned to the selected node;
transmitting, by the one or more devices and when a device memory, associated with the one or more devices, does not have capacity to store an unknown address associated with a packet, the packet to a destination device using the selected node; and
when the device memory does have capacity to store the unknown address associated with the packet:
storing, by the one or more devices, the unknown address in the device memory; and
transmitting, by the one or more device, the packet to the destination device independent of using the selected node.

10. The method of claim 9, further comprising:
transmitting, when the device memory does not have the capacity to store the unknown address, a notification, to the selected node, that identifies a protocol to be used when transmitting the packet to the selected node.

11. The method of claim 9, where assigning the score to each of the plurality of nodes includes:
determining that a first node, of the plurality of nodes, includes a first node memory associated with a first capacity;
determining that a second node, of the plurality of nodes, includes a second node memory associated with a second capacity; and
assigning a higher priority to the first node than the second node based on a determination that the first capacity is greater than the second capacity.

12. The method of claim 9, where selecting the node includes:
ranking the plurality of nodes based on scores assigned to the plurality of nodes; and
selecting the node based on a determination that the selected node is ranked higher than another node of the plurality of nodes.

13. The method of claim 9, further comprising:
receiving another packet destined for a host device;
determining that the device memory does not have the capacity to store a destination address or a source address obtained from the other packet; and
transmitting the other packet to the selected node.

14. The method of claim 9, where identifying the distance to each of the plurality of nodes includes:
identifying a hop count associated with a network path between the selected node and one of the plurality of nodes,
where the hop count corresponds to a quantity of nodes via which a packet is transported between the selected node and the one of the plurality of nodes via the network path.

15. The method of claim 9, where the selected node is a first node, and where the method further comprises:
selecting a second node, of the plurality of nodes, based on a second score assigned to the second node,
where selecting the second node allows the packet to be transmitted to the destination device, via the second node, when the first node is not available to transmit the packet to the destination device.

16. A device comprising:
a memory to store instructions; and
a processor to execute the instructions to:
receive, from a plurality of nodes, overflow information associated with the plurality of nodes,
the overflow information including information indicating, for each of the plurality of nodes, a capacity of a node memory included in a respective node of the plurality of nodes;
identify a distance to each of the plurality of nodes;
assign a score to each of the plurality of nodes,
the score for the respective node being based on a capacity of the node memory included in the respective node and a distance to the respective node;
select a node, of the plurality of nodes, based on the score assigned to the selected node;

when the device does not have capacity to store an unknown address associated with a packet, transmit the packet to a destination device using the selected node; and when the device does have capacity to store the unknown address associated with the packet, store the unknown address and transmit the packet to the destination device independent of using the selected node.

17. The device of claim 16, where the processor is further to:

transmit, when the device does not have the capacity to store the unknown address, a notification, to the selected node, that identifies a protocol to be used when transmitting the packet to the selected node.

18. The device of claim 16, where the processor, when assigning the score to each of the plurality of nodes, is to:

determine that a first node, of the plurality of nodes, is associated with a first capacity;

determine that a second node, of the plurality of nodes, is associated with a second capacity; and assign a higher priority to the first node than the second node based on a determination that the first capacity is greater than the second capacity.

19. The device of claim 16, where the selected node is a first node and where the processor, when selecting the node, is to:

rank the plurality of nodes based on scores assigned to the plurality of nodes; and select the first node based on a determination that the first node is ranked higher than a second node of the plurality of nodes, and the processor, when identifying the distance to each of the plurality of nodes, is to:

identify a hop count associated with a network path between the first node and one of the plurality of nodes, where the hop count corresponds to a quantity of nodes via which a packet is transported between the first node and the one of the plurality of nodes via the network path.

20. The device of claim 16, where the selected node is a first node and where the processor is further to:

select a second node, of the plurality of nodes, based on a second score assigned to the second node, where selecting the second node allows the packet to be transmitted to the destination device, via the second node, when the first node is not available to transmit the packet to the destination device.

* * * * *